Patented Dec. 10, 1935

2,023,500

UNITED STATES PATENT OFFICE 2,023,500

METHOD OF MANUFACTURING A STABLE DRY LEAVENOUS AGENT FOR BAKING PURPOSES

Hans Wögerbauer, Vienna, Austria

No Drawing. Application September 29, 1933, Serial No. 691,573. In Austria October 4, 1932

13 Claims. (Cl. 99—10)

This invention relates to a new and improved method of manufacturing a stable dry leavenous agent.

The method according to the invention consists essentially in admixing a liquid culture of acid producing bacteria (more particularly lactic acid bacteria) or of the bacteria of leaven, or a mixed culture containing such bacteria and yeast, with such an excess of a food flour (for example five to ten times the quantity of the culture) that the flour is uniformly moistened throughout without becoming sticky, after which the mixture is allowed to ferment, preferably in bulk of considerable depth, until, after initial increase in the moisture content, the mixture has become so dry that it is readily capable of being milled without further drying.

In the manufacturing of the liquid culture all the known advances in the art of dough fermentation induced by leaven can be made use of. It is thus advisable, for example, in the case of a mixed culture, first to prepare a nutritive medium by the fermentation of a suitable nutrient solution with acid producing bacteria (for example pure cultures of lactic acid bacteria) at temperatures favourable to pure acid fermentation, and only then to inoculate this acid nutrient solution with yeast (for example a pure culture of yeast derived from leaven), and to leave the solution to ferment at temperatures slightly above the optimal temperature for the reproduction of the yeast (25–28° C.), to bring about a vigorous development of the yeast.

It is preferable, in the preparing of the liquid culture, to proceed from a sponge or starter (a portion of fermenting dough reserved for the purpose), and to work the same up, in the manner usual in bread fermentation by leaven, to a fermenting dough of increasing bulk by progressive additions of flour and water. After the attainment of the required degree of ripeness this mass is thinned with water to reduce the same to a liquid state, and then used for moistening the large quantity of flour to be caused to ferment, for the purpose of obtaining the dry leavenous agent in accordance with the invention. In order to avoid with certainty the occurrence of putrefaction during the fermentation of the moist flour mass which lasts for several days, great care must be taken in the preparation of the starter, which can be made, for example, by inoculating liquid dough with pure cultures of acid bacteria or with a pure culture of leaven specially prepared for the purpose. If it is desired to obtain a mixed culture in this manner it is advisable in this case also to subject the quantity of dough from which the starter is to be made, first to a process of acidification alone, and to inoculate with yeast only after the attainment of the required degree of acidity.

The leavenous agent thus produced is added either to the flour, or to the liquid used in impasting the flour, or to the dough, in the proportion of about 4–9 percent by weight of the flour used.

The dry leavenous agent obtained in this manner, which can be marketed and used in commixture with other baking agents, for example diastase preparations, possesses very high natural acid content amounting to or even exceeding twenty degrees of acidity (equivalent to 20 ccm. normal NaOH for 100 g. of the finished product), and has excellent keeping properties. A further advantage is that artificial drying is dispensed with, although not of necessity.

The following quantitative example may be given:

1 litre of milk, after undergoing acid fermentation induced by a pure culture, is set to rye flour in the proportion of 2:1 or 1:1, and made to a smooth dough. This sponge is left to ferment at a room temperature of 35–42° C. until the fermenting activity subsides, which generally takes place in four to five days' time. Yeast, for example a pure culture of leaven yeast, is then added to the dough. In the production of a mere acid generating leavenous agent (without yeast) this addition of yeast must of course be omitted. For the purpose of the progressive enlarging of the volume of the starter thus obtained, further quantities of flour and water are admixed at intervals of 6–24 hours, and the mixture left to ferment at a room temperature of about 37–38° C. The quantity of water added is doubled each time, and the quantity of flour added is so increased that a very firm dough is finally produced. After attaining the requisite ripeness this dough is mixed with water to form a thinly liquid suspension. After being left to stand for 6–12 hours this liquid culture, which is now of an acidity of 14.5° (equivalent to 14.5 ccm. normal NaOH for 100 g. of the liquid culture), is employed for the thorough moistening of rye flour, for which purpose about 10–15 litres of the culture are required for 100 kg. of the flour. The flour should, on the one hand, not become tacky, which would hamper the drying process, but on the other hand should become thoroughly moistened by the liquid, since otherwise putrid fermentation is apt to be set up.

The soaked flour is heaped up on floors to a depth of 2 metres, and left lying at a room temperature of 35° C. for 48 hours. By this time lively fermentation has already set in, the mixture having thereby become more moist, but without sticking. The mass must then be turned at intervals of 12-48 hours, the alcohol generated being thereby caused to volatilize. The elimination of the alcohol can also be aided by aeration, it being possible to draw off and to condense the alcohol vapours. After seven to ten days the mixture thus treated has again become sufficiently dry to permit of being milled, and filled into sacks or otherwise packed. This entire fermenting process can also be carried out in bins or drums as employed in conjunction with the pneumatic method of green malt production.

In order to completely finish the fermenting process, it is advisable to store the leavenous agent thus produced, when packed, in warm conditions. The material is now ready for despatch, but should, if possible, be once more sifted and aerated.

In order to economize in the use of the dry finished leavenous agent a special dough-fermentation method can be adopted in which the leavenous agent, instead of being used directly for starting the fermentation of the bulk of the dough, is first propagated in a prime dough, at temperatures favourable to acid fermentation, up to an advanced stage of acid formation, and this prime dough then employed for starting the fermentation of the dough to be baked. For this purpose the leavenous agent is thinly impasted with flour and water and left to ferment at 35-50° C., for about 24 hours. By correct proportioning of the starter, over-acidification can be avoided with certainty, even if the starting dough be left to ferment for 40 hours, since the process of fermentation ceases after the attainment of a certain degree. The occurrence of acetic acid and butyric acid fermentation, which is so feared in connection with the usual method of dough fermentation by leaven, is precluded with certainty in the present process, since the starter is a lactic acid culture which is, practically speaking, a pure culture. This stage of the process may be carried out as follows:

5 kg. of the dry leavenous agent and 5 kg. of rye flour are stirred up in 25 litres of water at 40-45° C. The mass is left to ferment at 40-45° C. for 24 hours, after which the fermenting mass is worked up, with the addition, of 75 litres of water of 17-24° C., 2 kg. of bakers' yeast, and other usual additions and the necessary amount of flour to the final dough which is then left to stand until it has risen sufficiently.

A particular manner of manufacturing the leavenous agent according to the present invention, which permits of the very economical use of the same even when utilized for the direct fermentation of dough, consists in the subsequent incorporation in the finished dry leavenous agent made by the described method, of a quantity of a fresh culture of acid bacteria, more particularly lactic acid bacteria, or leaven bacteria, or a mixed culture containing acid bacteria and yeast. In this manner the behaviour and inherent properties of the leavenous agent, and more particularly its stability, are not altered, while the agent is improved, inasmuch as in use the immediate and simultaneous growth of the acid bacteria and of the yeast in the dough is ensured. It thus becomes possible to use the leavenous agent for the direct fermentaiton of dough in a manner similar to that of straight fermentation of dough with the aid of a large quantity of yeast.

The culture can be added to the finished dry leavenous agent in a liquid state, or better, in the form of a dry preparation. It is possible to employ for this purpose the same culture as that used in the manufacturing of the original leavenous agent; or there may be used in part or entirely different cultures, for the described improvement of the original leavenous agent. This improving method may be practiced as follows:

12 kg. of the mixed culture of acid bacteria and yeast employed in the manufacturing of the original leavenous agent are stirred up with 60 litres of water of 45° C., 10 kg. of rye flour, 2 kg. of ground malt, and 5 kg. of whiting, and kept covered at 40° C., with frequent stirring, for 48 hours. At the end of this time the mixture must be densely permeated with typical lactic acid rods, and is then mixed with 300 kg. of flour in a mixing machine to form a slightly moist powder which is then dried by exposure to air in a thin layer. The dry product is milled, and intimately admixed, in a proportion of 5-10%, with a dry leavenous agent manufactured by the method described above.

I claim:—

1. A method of manufacturing a stable dry leavenous agent which comprises admixing a culture of acid producing bacteria with food flour in the presence of only such an amount of water that the flour is moistened without becoming sticky, and allowing the mixture to undergo a long-period dough fermentation.

2. A method of manufacturing a stable dry leavenous agent which comprises admixing a culture of acid producing bacteria with food flour in the presence of only such an amount of water that the flour is moistened without becoming sticky, and causing the mixture to undergo a long-period dough fermentation, while allowing the fermentation to proceed up to a point at which the mixture has become sufficiently dry to permit of being milled without artificial drying.

3. A method of manufacturing a stable dry leavenous agent which comprises admixing a lactic acid bacteria culture with food flour in the presence of only such an amount of water that the flour is moistened without becoming sticky, and allowing the mixture to undergo a long-period dough fermentation.

4. A method of manufacturing a stable dry leavenous agent which comprises admixing a mixed culture of acid producing bacteria and yeast with food flour in the presence of only such an amount of water that the flour is moistened without becoming sticky, and allowing the mixture to undergo a long-period dough fermentation.

5. A method of manufacturing a stable dry leavenous agent which comprises preparing a liquid culture of lactic acid bacteria, admixing the said liquid culture with a fivefold to tenfold quantity of a food flour, and allowing the moistened flour to undergo, in bulk of considerable depth, a long-period dough fermentation until the same has become sufficiently dry to permit of being milled without artificial drying.

6. A method of manufacturing a stable dry leavenous agent which comprises preparing a mixed liquid culture of lactic acid bacteria and yeast, admixing the said liquid culture with a fivefold to tenfold quantity of a food flour, and allowing the moistened flour to undergo, in bulk of considerable depth, a long-period dough fermentation until the same has become sufficiently dry to permit of being milled without artificial drying.

7. A method of manufacturing a stable dry leavenous agent, which method comprises inoculating a starchy liquid nutritive medium with a pure culture of lactic acid bacteria, allowing the medium to ferment at a temperature favorable to pure lactic acid fermentation, inoculating this fermenting nutrient solution with a pure culture of yeast, leaving the solution to ferment at a temperature favorable to the reproduction of the yeast, admixing the fermenting liquid culture with a fivefold to tenfold quantity of a food flour and causing the moistened flour to ferment, while allowing the fermentation to proceed up to a point at which the material has become sufficiently dry to permit of being milled without artificial drying.

8. A method of manufacturing a stable dry leavenous agent, which method comprises preparing a sponge or starter with the aid of culture of lactic acid bacteria and yeast, working up this starter to a fermenting dough of increasing bulk by progressive additions of flour and water, allowing the leaven thus prepared to ripen, and then thinning the leaven with water to reduce it to a liquid state; then admixing the liquid culture thus prepared with a fivefold to tenfold quantity of a food flour, and causing the moistened flour to ferment, while allowing the fermentation to proceed up to a point at which the material has become sufficiently dry to permit of being milled without artificial drying.

9. A method of manufacturing a stable dry leavenous agent comprising causing a food flour to undergo dough fermentation, in a non-impasted but only weakly moistened condition, while driving away, by volatilization, the alcohol generated, the said fermentation being conveyed up to the point at which the fermenting flour has become sufficiently dry to permit of being milled, then storing the material in warm conditions to completely finish the fermenting process, and finally sifting and aerating the fermented material.

10. A method of manufacturing a stable dry leavenous agent, which comprises causing a food flour to undergo dough fermentation in a non-impasted but only weakly moistened condition while allowing the fermentation to proceed up to a point at which the fermenting flour has become sufficiently dry to permit of being milled, and then introducing into the finished dry leavenous agent thus prepared a fresh culture of bread fermentation ferments.

11. A method of manufacturing a stable dry leavenous agent, which comprises causing a food flour to undergo dough fermentation in a non-impasted but only weakly moistened condition, while allowing the fermentation to proceed up to a point at which the fermenting flour has become sufficiently dry to permit of being milled, then introducing into the finished dry leavenous agent thus prepared a fresh culture of bread fermentation ferments in the form of a dry preparation.

12. A method of manufacturing a stable dry leavenous agent, which comprises causing a food flour to undergo dough fermentation in a non-impasted but only weakly moistened condition, while allowing the fermentation to proceed up to a point at which the fermenting flour has become sufficiently dry to permit of being milled, then introducing into the finished dry leavenous agent thus prepared a fresh culture of lactic acid bacteria.

13. A method of manufacturing a stable dry leavenous agent, which comprises causing a food flour to undergo dough fermentation in a non-impasted but only weakly moistened condition while allowing the fermentation to proceed up to a point at which the fermenting flour has become sufficiently dry to permit of being milled, then introducing into the finished dry leavenous agent thus prepared a fresh mixed culture of lactic acid bacteria and yeast.

HANS WÖGERBAUER.